3,178,455
2-DIPHENYLOXY-1-AMINO-4-AMINO OR
HYDROXY-ANTHRAQUINONE
Paul Grossmann, Binningen, and Paul Rhyner, Basel,
Switzerland, assignors to Ciba Limited, Basel, Switzerland, a company of Switzerland
No Drawing. Filed Jan. 11, 1963, Ser. No. 250,774
Claims priority, application Switzerland, Jan. 24, 1962,
893/62
2 Claims. (Cl. 260—380)

The present invention provides valuable new anthraquinone dyestuffs, advantageously free from acidic groups imparting solubility in water such as sulfonic acid groups and carboxylic acid groups, of the formula (1)
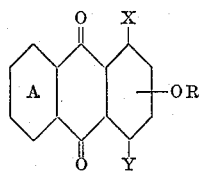

in which R represents a diphenyl radical bound to the oxygen atom advantageously in 2-position, X and Y represent hydroxyl groups or amino groups, and in which the ring A may be further substituted.

The new dyestuffs are obtained when a compound of the formula (2)
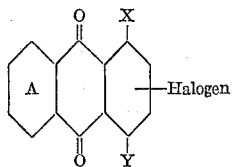

is reacted with a hydroxydiphenyl, advantageously with an orthohydroxy-diphenyl, in which formula A, X and Y have the meanings given above.

Those compounds of Formula 2 that contain bromine as halogen are advantageously used as starting materials, and especially 1-amino-2-bromo-4-hydroxyanthraquinone. As further starting materials the following may be mentioned:

1:4-dihydroxy-2-bromoanthraquinone,
1-hydroxy-2-bromo-4-aminoanthraquinone, and
1:4-diamino-2-bromoanthraquinone.

The hydroxydiphenyls to be used in the process of the invention may also contain other substituents in the benzene radicals, for example, halogen atoms such as chlorine or bromine and alkyl or alkoxy groups. However, of special interest on account of its easy availability is unsubstituted 2-hydroxy-diphenyl also known as ortho-phenylphenol. Mixtures of different ortho-hydroxydiphenyls and 3- or 4-hydroxydiphenyl can also be used. Instead of using halogenated hydroxydiphenyls in the reaction with the halogen containing anthraquinone, it is also possible to halogenate the finished dyestuffs.

The reaction is advantageously carried out by melting the components in the presence of a strongly alkaline agent at a temperature between 130 to 180° C., preferably between 135 to 160° C. An excess of the hydroxydiphenyl is advantageously used amounting to 3 to 6 times the weight of halogen-anthraquinone compound. As strongly alkaline agents may be used, for example, alkali metal hydroxides such as sodium hydroxide or potassium hydroxide or carbonate.

The new dyestuffs so obtained are eminently suitable, especially after having been converted into a finely dispersed form for dyeing and printing synthetic fibrous material, especially material made of aromatic polyesters. On such materials pure, strong orange to red dyeings are obtained that are distinguished by a specially good fastness to light and to sublimation when the dyestuffs are applied by the usual dyeing methods, for example, from a dyebath that contains a dispersion of the dyestuff and advantageously a dispersing agent at temperatures closely approaching 100° C., if desired, in the presence of a swelling agent, or at temperatures above 100° C. under superatmospheric pressure.

A further attribute of the dyestuffs obtained by the process of the invention is that they reserve well on wool, which makes them specially suitable for the dyeing of union fabrics made of polyester fibres and wool.

The dyestuffs of the invention are also suitable for application by the so-called Thermosol process in which the fabric to be dyed is impregnated, advantageously at a temperature not exceeding 60° C., with an aqueous dispersion of the dyestuff, which advantageously contains 1 to 50% of urea and a thickening agent, especially sodium alginate, and the impregnated goods are squeezed in such a manner that they retain 50 to 100% of their dry weight of dye-liquor.

In order to fix the dyestuff, the fabric so impregnated is heated to a temperature above 100° C., for example, to a temperature between 180 to 210° C. in a current of hot air, advantageously after intermediate drying.

The Thermosol process just mentioned is of special interest for the dyeing of union fiabrics made of polyester fibers and cellulosic fibers, especially cotton. In this case, the padding liquor contains, in addition to the dyestuffs to be used in the process of the invention, dyestuffs suitable for dyeing cotton, for example, vat dyestuffs. When the latter are used, it is necessary to treat the padded fabric with an aqueous alkaline solution of one of the reducing agents normally used in vat dyeing after the heat treatment.

Unless otherwise stated, the parts and percentages in the following examples are by weight:

*Example 1*

12 parts of 1-amino-2-bromo-4-hydroxyanthraquinone were heated for 10 to 15 hours at 160° C. with 6 parts of potassium hydroxide in 60 parts of ortho-phenylphenol. The reaction mixture was allowed to cool to 90° C. and the product precipitated with 40 parts of a 40% sodium hydroxide solution and 200 parts of water. After filtration at 20 to 30° C., the radical was washed with water, acidified and then washed until neutral. The bright red press-cake was ground to a fine dispersion with a suitable dispersing agent and with the dispersion so obtained pure, bluish red tints were produced on polyester fibers possessing a good fastness to light and to sublimation. The dispersion also reserved well on wool.

If para-phenylphenol is used instead of ortho-phenylphenol a dyestuff with similar dyeing properties is obtained.

*Example 2*

12 parts of 2-bromoquinizarine were reacted with ortho-phenylphenol as described in Example 1. Precipitation was effected with 40 parts of a 40% sodium hydroxide solution and 400 parts of water. The dyestuff so obtained dyed polyester fibers orange tints possessing a good fastness to sublimation.

*Example 3*

25.4 parts of 1:4-diamino-2-bromanthraquinone, 100 parts of ortho-phenylphenol and 6.5 parts of potassium carbonate were mixed together and heated for 18 hours at 155° C., while stirring. The reaction mixture was allowed to cool and while stirring, 240 parts of a 30% aqueous sodium hydroxide solution and 1600 parts of water were added. The precipitated dyestuff was filtered off, washed and dried. It dissolved in organic solvents to give a violet solution and dyed polyester fibers violet tints possessing very good properties of fastness when applied as a fine despersion.

*Example 4*

1 part of an aqueous paste of 1-amino-2-α-phenyl-phenoxy-4-oxy anthraquinone together with approximately 1 part of dried sulfite cellulose waste liquor were ground into a fine paste in a roller mill, the paste so obtained having a dyestuff content of about 10%.

100 parts of fibrous material of polyethylene terephthalate were washed for 30 minutes in a bath containing 1 to 2 parts of the sodium salt of N-benzyl-μ-heptadecyl-benzimidazole-disulfonic acid and 1 part of a concentrated aqueous ammonia solution per 1000 parts of water. The material was then entered into a dyebath containing 3000 parts of water in which have been dispersed 10 parts of the dyestuff paste obtained as described in the first paragraph of this example, and which also contained 54 parts of the sodium salt of N-benzyl-μ-heptadecyl-benzimidazole-disulfonic acid and 3 parts of 40% acetic acid. The whole was heated to 130° C. in a pressure vessel and maintained at that temperature for approximately ½ hour. Subsequently, the material was well rinsed and, if necessary, washed for 30 minutes at 60 to 80° C. with a solution that contained 1 part of the sodium salt of N-benzyl-μ-heptadecyl-benzimidazole-disulfonic acid per 1000 parts of water. A bluish red dyeing was obtained possessing good properties of fastness.

What is claimed is:

1. An anthraquinone dyestuff of the formula

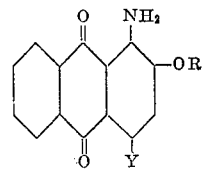

in which R represents diphenyl and Y a member selected from the group consisting of hydroxyl and amino.

2. The anthraquinone dyestuff of the formula

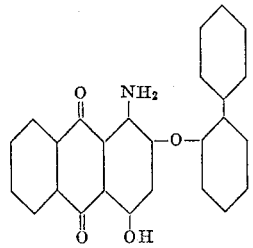

References Cited by the Examiner

UNITED STATES PATENTS 2,992,240   7/61   Lodge. _____ 260—380

LORRAINE A. WEINBERGER,
*Acting Primary Examiner.*

LEON ZITVER, *Examiner.*